United States Patent [19]
Huignard et al.

[11] 4,286,838
[45] Sep. 1, 1981

[54] COMPACT OPTICAL STRUCTURE WITH INTEGRATED SOURCE

[75] Inventors: Jean-Pierre Huignard; Pierre Leclerc; Jean-Claude Carballes; Armand Nappo, all of Paris, France

[73] Assignee: Thomson-CSF, Paris, France

[21] Appl. No.: 42,602

[22] Filed: May 23, 1979

[30] Foreign Application Priority Data

May 26, 1978 [FR] France .................. 78 15794

[51] Int. Cl.³ .................................. G02B 5/14
[52] U.S. Cl. ..................... 350/96.11; 350/96.12; 350/96.19; 357/18
[58] Field of Search .............. 357/17, 18; 350/96.11, 350/96.12, 96.13, 96.15, 96.19, 162 R, 3.61, 3.62, 3.70

[56] References Cited

U.S. PATENT DOCUMENTS

| | | | |
|---|---|---|---|
| 3,774,987 | 11/1973 | Boivin | 350/96.19 X |
| 3,809,686 | 5/1974 | Chandross et al. | 350/96.12 |
| 3,814,498 | 6/1974 | Tomlinson et al. | 350/96.19 |
| 3,877,784 | 4/1975 | Lin | 350/96.13 X |
| 3,884,549 | 5/1975 | Wang et al. | 350/96.12 |
| 3,891,302 | 6/1975 | Dabby et al. | 350/96.19 |
| 3,908,121 | 9/1975 | Riseberg et al. | 350/96.13 X |
| 4,085,501 | 4/1978 | Currie | 350/96.11 X |
| 4,093,339 | 6/1978 | Cross | 350/3.70 |
| 4,138,196 | 2/1979 | Redman | 350/96.11 X |
| 4,155,056 | 5/1979 | Cross et al. | 350/96.12 X |

FOREIGN PATENT DOCUMENTS

2083418 12/1971 France.

OTHER PUBLICATIONS

Tomlinson et al., "Photoinduced Refractive Index Increase in ...", *Appl. Phys. Ltrs.*, vol. 16, No. 12, Jun. 1970, pp. 486–489.

Pennington et al., "Holographic Techniques for Fabrication of ...", *IBM Tech. Discl. Bull.*, vol. 14, No. 5, Oct. 1971, pp. 1493–1494.

Fulenwider, "Some Potential Impacts of Optical Fiber Transmission ...", IEEE Intercon Conf. Record (New York), Apr. 1975, pp. (5-5) 1–6.

Tomlinson et al., "Multicomponent Photopolymer Systems for ...", *Applied Optics*, vol. 15, No. 2, Feb. 1976, pp. 534–541.

*Primary Examiner*—John K. Corbin
*Assistant Examiner*—John D. Lee
*Attorney, Agent, or Firm*—Cushman, Darby & Cushman

[57] ABSTRACT

The invention relates to a compact optical structure comprising a semiconductor emitter junction, a laser or a light emitting diode, coupled to a plane waveguide formed by a layer of photo-polymer deposited on a substrate with a suitable index. A surface layer, of photo-polymer for example, enables the registration of photo-induced diffraction structures performing particular optical functions such as that of a distributed reflector, deflector or lens. Such compact structures are applicable, in particular to the designing of simple, small devices, laser sources with distributed external resonators, interferometric gyrometers, hydrophones, multiplexers or demultiplexers.

13 Claims, 11 Drawing Figures

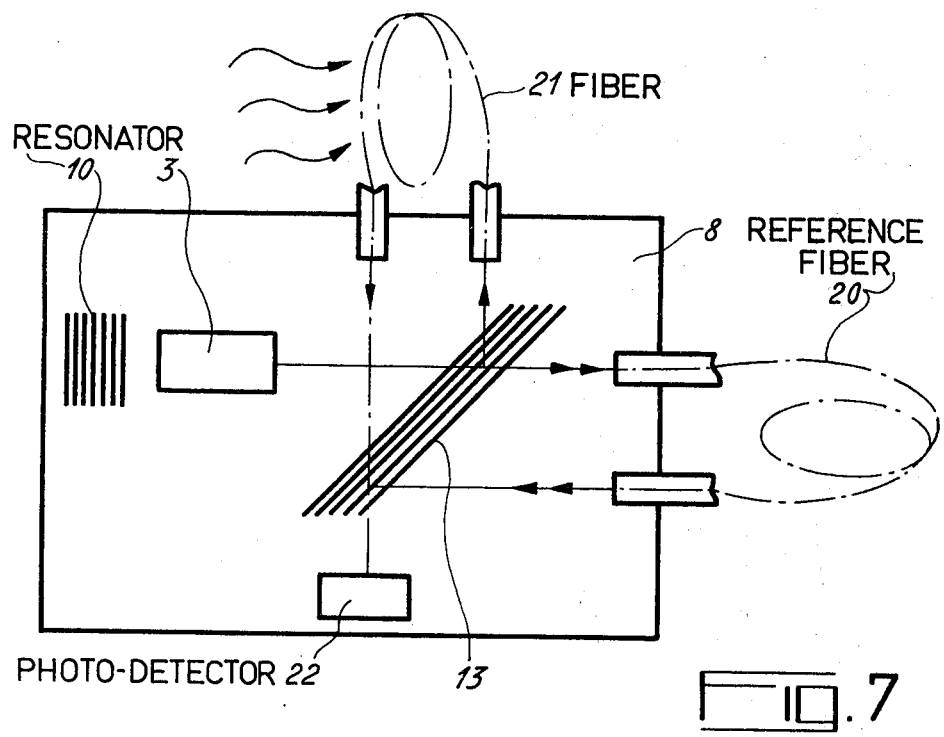
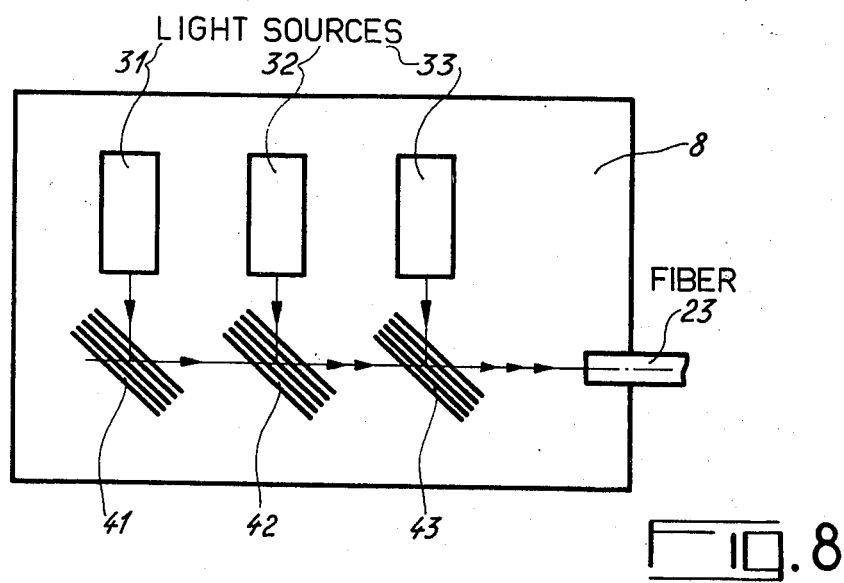

COMPACT OPTICAL STRUCTURE WITH INTEGRATED SOURCE

BACKGROUND OF THE INVENTION

1. Field of the Invention

The invention relates to compact optical devices and, more particularly, to a compact optical structure wherein the source is integrated and which additionally comprises diffraction structures inscribed on the surface of a plane waveguide associated with the source.

2. Summary of the Invention

In the field of interferometry, it is possible, for example, to design a SAGNAC effect gyrometer or a hydrophone wherein all the optical functions necessary for such applications can be integrated in one and the same layer on the surface of a plane waveguide. For this purpose, the waveguide is a layer of photo-polymer sensitized in the visible range and deposited on a substrate on whose surface is provided a layer of silicon dioxide, the optical functions being inscribed on the surface of the photo-polymer layer by photoinduction of index variations before the total polymerisation which makes the photo-polymer transparent, i.e. by localized photosensitization in the layers of photosensitive resin deposited on the surface of the layer of photo-polymer, the resin then being developed to form a diffraction structure in relief on the surface of the waveguide.

Such a structure, wherein a single-mode source of small size and a well defined wavelength is associated with a plane waveguide on those surface diffraction structures performing optical functions such as the separation of light, deflection of light, lens, reflection of light can be inscribed, is particularly suitable for numerous applications in the fields of optical telecommunications, the storage of information in two states, or interferometry.

BRIEF DESCRIPTION OF THE DRAWINGS

The invention will be more readily understood and other features will become apparent from the following description given with reference to the attached figures, wherein:

FIG. 7 represents a hydrophone using the same structure.

FIG. 8 represents a means multiplexing optical carriers with different wavelengths using said same structure.

DESCRIPTION OF THE PREFERRED EMBODIMENTS

Figure 1:
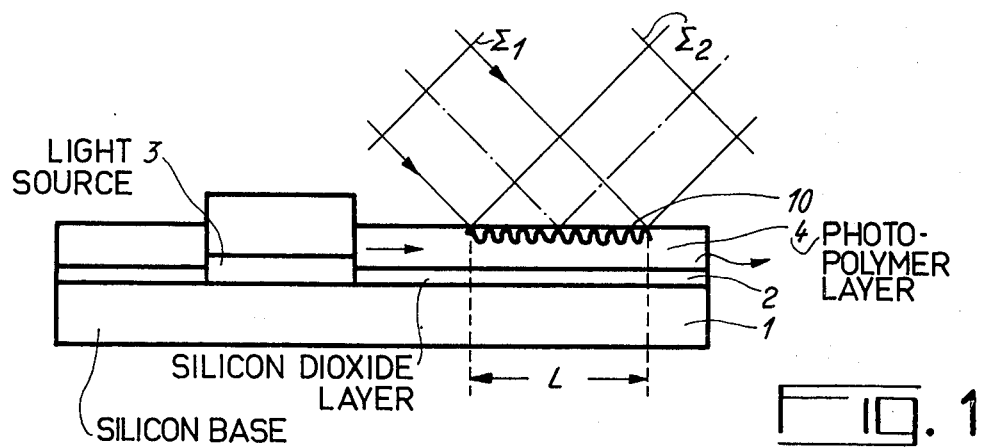
FIGS. 1 and 2 show cross-sections of a first and a second form of embodiment of a compact optical structure with an integrated source according to the invention.

FIG. 1 represents a first form of embodiment of a compact optical structure according to the invention. It comprises a substrate constituted, for example, by a silicon base 1 and a silicon dioxide layer, 2, epitaxially deposited on the silicon base; then, this layer is removed, chemically for example, in a zone intended to receive a semiconductor light source 3. Said source can be a light-emitting diode or a semiconductor laser, As Ga for example, which will be soldered to the silicon using indium solder. A layer of photo-polymer material, 4, is deposited on the silicon dioxide layer. The photo-polymer material used is such that variations in index can be photo-induced therein by exposure to radiation of a wavelength comprised between 0.4 and 0.55 $\mu$m, for example radiation emitted by an Argon laser (0.51 $\mu$m). The thickness of the photopolymer layer is in the order of a few micrometers and this layer forms both a light guide for the radiation emitted by the semiconductor source after polymerisation and a support for photo-inducing the useful optical functions in the structure integrated, using holography, in the form of photo-induced strata. For this purpose, the photopolymer layer is subjected, before, polymerisation, to interference between two waves emitted by the same external laser. For example, if, as shown in FIG. 1, the structure to be integrated forms a semiconductor laser with an external resonator, 10, the optical function to be integrated on the photopolymer support is a system of parallel lines normal to the direction in which the photons are emitted by the junction. Only the face of the junction opposite the face of emission towards the system is split and the resonance effect is obtained between the split face and the system functioning by reflection of the guided wave. For this purpose, the pitch $\Lambda$ of the system is selected as a function of the wavelength $\lambda$ of the photons emitted in the photo-polymer in such a way that $\Lambda = \lambda/2n$, wherein n is the index of the photopolymer. In order to provide such a system in the layer by means of an Argon laser with a wavelength of $\lambda_o = 450$ mm, the index of the photo-polymer being 1.5, and the wavelength of the photons emitted by the AsGa laser being $\lambda = 900$ nm, the pitch of the strata must be $\Lambda = 300$ nm, that is to say that the angle of incidence $\theta$ of the two plane waves $\Sigma_1$ and $\Sigma_2$ interfering in the photo-polymer must be such that $\sin\theta = \lambda_o/2\Lambda$, i.e. 48°. The length L of the resonator is selected so as to obtain in the layer high efficiency of diffraction by reflection and an equally high spectral sharpness. For example, in order to obtain 96% diffraction efficiency at the wavelength of the semiconductor source with a photo-induced index modulation of $\delta n = 10^{-4}$, the length of the resonator can be L = 10 mm and, in this case, the spectrum width of the radiation emitted by such a laser formed by the source and the resonator will be $\Delta\lambda = 0.8$ Å.

In fact, when exposure to the radiation designed to provide the optical functions takes place before total polymerisation, as described above, partial and superficial polymerisation takes place in the zones illuminated and there is monomer diffusion from the illuminated zones to the non-illuminated zones. This monomer-polymer gradient of concentration leads to local variations in index which are preserved during polymerisation using noncoherent uniform ultraviolet illumination. After said polymerisation, the photo-polymer becomes rigid and completely transparent in the visible range and near infrared range. As its refractive index is $n=1.5$ and that of the silicon dioxide layer 1.46, the wave emitted by the AsGa laser is guided through the photo-polymer layer.

Figure 2:
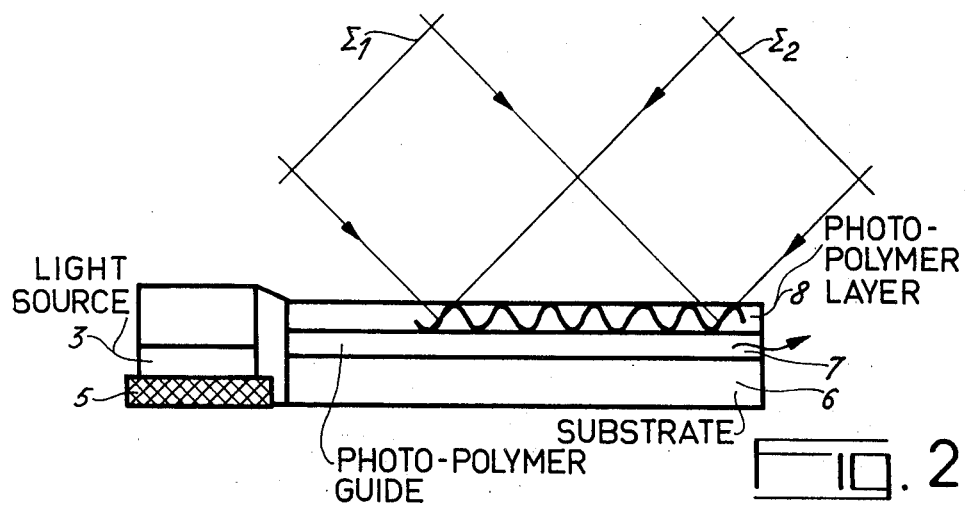

In the structure described above in connection with FIG. 1, the source is placed on a large face of the substrate, the oxide layer having been removed in order to maintain the proper thermal properties of the laser, and the photo-polymer layer then being placed in such a way as to come into contact with the emission face of the source. Instead of placing the source on the substrate, it is also possible to place the emission face of the source in contact with a small face of the substrate provided with a layer of photo-polymer in such a way that the photons emitted by the source are guided in the layer of photo-polymer. In addition, instead of inscribing the optical functions before polymerisation, it is possible to carry out said polymerisation in two stages, with inscription taking place between said two stages. The compact optical structure represented in FIG. 2 shows these two arrangements. Such a structure comprises a semiconductor emitter junction, 3, provided with its heat sink 5, brought into contact with a substrate of silicon dioxide 6. A first thin layer of photo-polymer, 7, several $\mu$m thick, has been deposited on said substrate. Said layer is polymerised by illumination with uniform, non-coherent UV radiation. Then, a second layer of photo-polymer, 8, is deposited on the first one and the necessary optical functions, for example the system of parallel strata described above and acting, when in operation, as resonator 10, is inscribed in said second layer which is then completely polymerised with uniform UV radiation. The junction is then conveniently positioned in relation to the resonator by means of micromanipulations. The exit face of the emitter junction and the entry of the photo-polymer guide are optically and mechanically associated by means of a drop of photo-polymer. The assembly is caused to adhere by polymerisation using non-coherent, uniform UV illumination.

Figure 3:
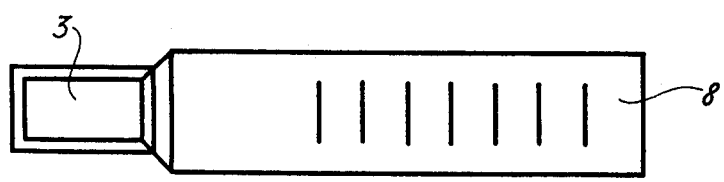
FIG. 3 is a top view of the second form of embodiment of the structure according to the invention.
Figure 4:
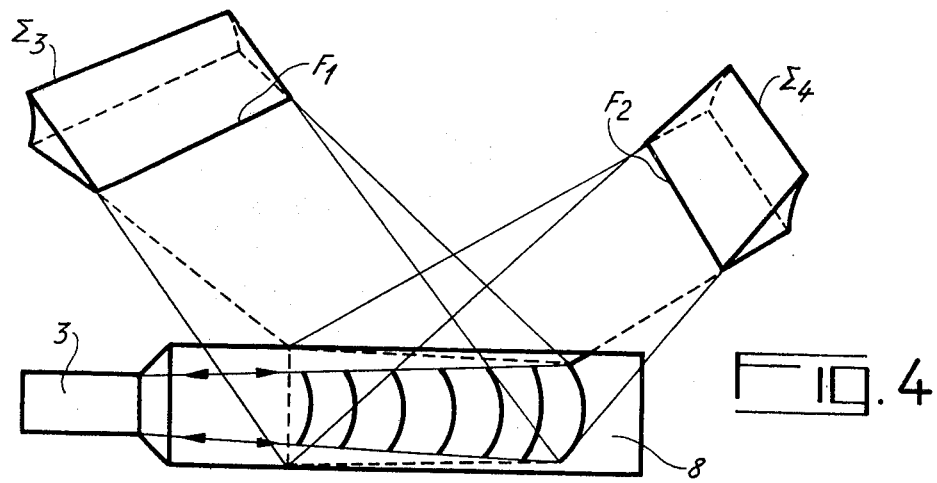
FIG. 4 is a top view of a third form of embodiment of the structure according to the invention, having the same structure as that represented in conjunction with FIGS. 2 and 3.

With plane waves $\Sigma_1$ and $\Sigma_2$, the photo-induced strata are straight, as shown in FIG. 3, which is a top view of the optical structure represented in FIG. 2. However, owing to the diffraction, the losses can be considerable. In order to reduce said losses, strata which are equidistant, but which have a certain radius of curvature, can be photo-induced to form the external resonator associated with the semiconductor source. Such a structure is represented in top view in FIG. 4. In order to obtain such photo-induced strata, cylindrical waves emitted, for example, from cylindrical lenses whose focal lines, $F_1$ and $F_2$, are orientated in the plane of FIG. 4 are used instead of plane waves $\Sigma_1$ and $\Sigma_2$. Such a device, comprising a resonator formed of equidistant cylindrical strata, enables the resonator to be operated satisfactorily, despite the divergency of the beam from the emitting junction, by reflection off the cylindrical strata.

In the compact optical structures described above, the photo-polymer has been used both as a waveguide and as a support for the registration of the optical functions, said functions being inscribed in the photo-polymer in the form of photo-induced index variations.

It is also possible to use the photo-polymer only as a waveguide and to use, for registration of the optical functions, a layer of photo-sensitive resin which, after registration and development, will form optical functions on the surface of the assembly by means of variations in relief or index.

Figure 5:
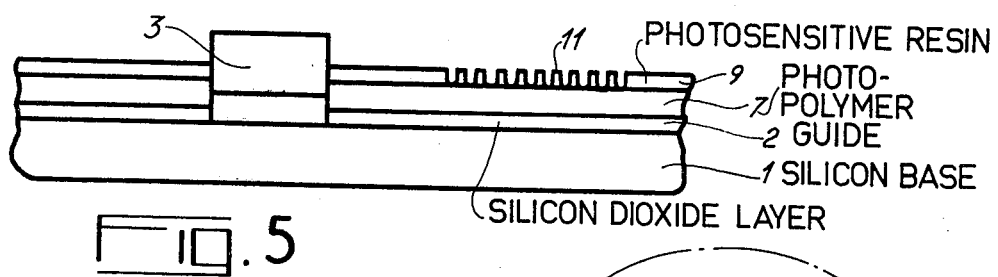
FIG. 5 represents another form of embodiment of the structure according to the invention.

An example of a compact optical structure with a photo-polymer waveguide and photo-sensitive resin is represented in FIG. 5, in which there is, again, a silicon base, 1, on which a layer of silicon dioxide, 2, has been deposited. The silicon dioxide layer has been removed in a zone intended to receive the emitter junction 3. A layer of photo-polymer, 7, has been deposited on the silicon dioxide and exposed to uniform, non-coherent UV radiation which polymerises the layer 7 forming the waveguide and makes it transparent. A layer of photo-sensitive resin, 9, is then deposited on the photo-polymer layer 7. Said layer is then exposed to the wave fronts designed to form the interference pattern ensuring the required optical function, for example, as previously described, to two plane wave fronts in order to form a system acting as a reflector and functioning in the first order to form a resonator associated with the emitter junction. Development of the layer using the appropriate developing agent then enables the relief system 11 to be formed.

Figure 6:
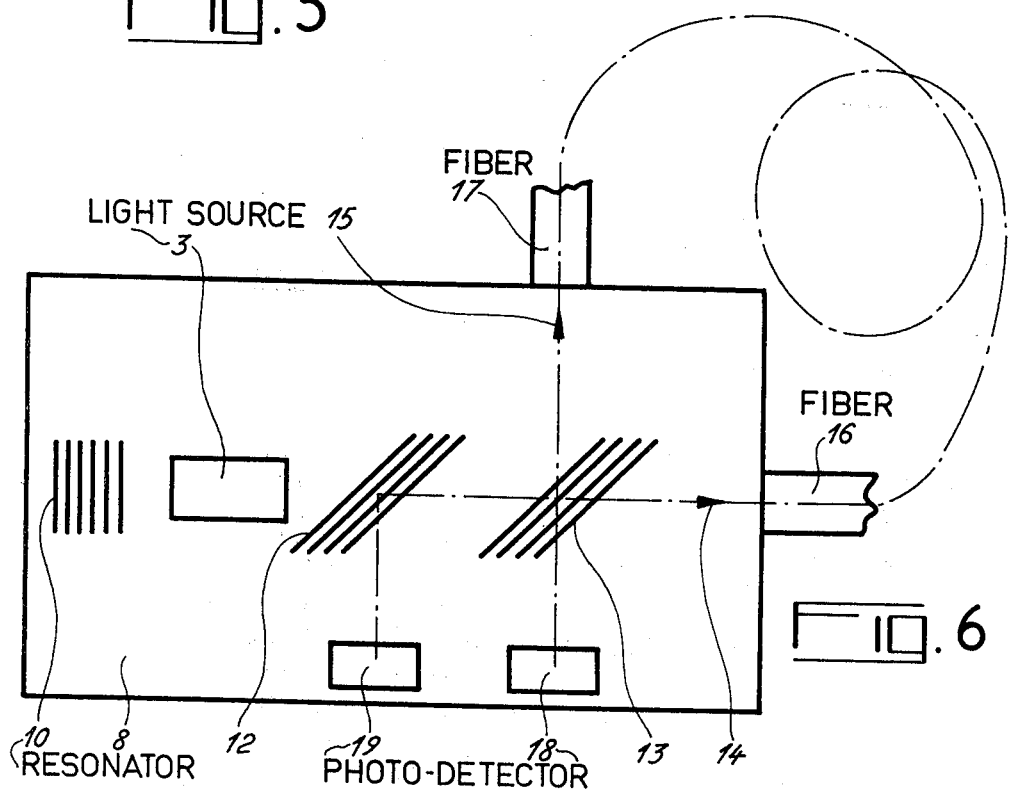
FIG. 6 represents an interferometric gyrometer using the compact optical structure according to the invention.

The only optical function that has been precisely described up to now is the resonator function, said resonator being formed of straight equidistant strata normal to the direction of the rays emitted by the emitter junction or formed of cylindrical equidistant strata and acting as a reflector functioning in the first order of diffraction. Other optical functions can also be registered in the surface layer of photo-polymer or photo-sensitive resin. First of all, it is possible, as shown in FIG. 6, to register straight equidistant strata which are, however, oblique in relation to the direction of the rays emitted by the laser. FIG. 6 represents a top view of a compact optical structure with the features described above and designed to form an interferometric gyrometer. The base structure can be, for example, that of FIG. 1, but with the two layers of photo-polymer deposited in succession, as described in connection with FIG. 2. In the thickness, there are successively a silicon base, 1, a silicon dioxide layer, 2, a first layer of photo-polymer forming a waveguide, 7, and an upper layer, 8, in which the optical functions are registered. The As Ga source, 3, is soldered on the silicon substrate. The functions registered are, on one hand, a resonator, 10, composed of strata normal to the direction of propagation of the optical wave with a length such that the diffraction efficiency is close to 100%. The assembly formed by the source, 3, with a split face and the resonator forms an AsGa laser source. On the path of the rays emitted by said source are registered two oblique parallel systems, 12 and 13, whose lengths are such that the diffraction efficiency is not equal to 100%. The second system, 13, has an efficiency equal to 50%.

The radiation emitted by the source and transmitted by the first system is separated by the second system into transmitted radiation, 14, and reflected radiation, 15. The two extremities, 16 and 17, of a coiled optical fiber are connected to the photo-polymer guide in order to pick up the two fractions of radiation emerging from the guide and these are guided through the fibre in two opposite directions. When the assembly is in rotation at the same time as an object whose angular velocity is to be measured, a phase difference which is a direct function of the angular velocity is created between the two fractions of radiation emerging at extremities 16 and 17 of the fiber after passing through said fiber, and said velocity can thus be measured by this means (use of the SAGNAC effect). For this purpose, the radiation from extremity 17 being partially transmitted by system 13 and the radiation from the extremity 16 being partially reflected by the system 13 in the same direction, a first photo-detector 18 picks up the radiation resulting from the interference set up between these two parts of radiation received. Said photodetector can be a silicon photo-diode obtained by implantation in the silicon substrate or a photo-sensor placed on the edge. Photo-detector 18 thus provides a first measurement of the angular velocity by counting the fringes passing the detector, with the pattern of fringes moving at the best frequency proportional to the speed of rotation. The radiation from the extremity 17 and reflected by the system 13, and the radiation from the extremity 16 and transmitted by the same system in the same direction also combine and the resulting radiation reflected by the system 12 can also be detected by a sensor, 19, thus providing a second measurement of the angular velocity. Depending on the value of said velocity, one or the other of said two measurements will afford greater accuracy than the other. It can be seen that a single system 13 enables the gyrometer to be operated. The compact optical structure with integrated source according to the invention thus makes it simple to obtain a high performance interferometric gyrometer which is reliable on account of its stability, no separate discrete components being required.

FIGS. 7 and 8 represent other applications using the same basic structure and the same optical functions.

FIG. 7 is a top view of a hydrophone. The structure is the same as that for the gyrometer shown in FIG. 6, but with a single system, 13, of the same length, that is to say that the diffraction efficiency is equal to 50%. This system, however, has longer lines as the optical return path is not superposed on the outgoing path. The source 3, associated with the resonator 10 emits the radiation towards the optical system, orientated at an angle of 45° in relation to the direction of propagation. The radiation transmitted by the system is received by one extremity of a coiled optical fiber, 20, which will be termed the reference fiber as it is not subjected to the acoustic wave to be detected. The other extremity of the coiled fiber 20 is also coupled to the waveguide of the plate and the radiation, after passing through the optical fiber, is emitted in the direction of network 13. At this point, it is split into radiation reflected by the system, which will be the useful radiation, and transmitted radiation. The radiation emitted by the source and reflected by system 13 is picked up by one extremity of a coiled fiber, 21, coupled to the guide and whose other extremity is also coupled to the guide. Said fiber is exposed to an acoustic wave having a frequency $\Omega$ to be detected. As a result of said acoustic wave, fibre 21 undergoes a change in index, in the order of $10^{-6}$ to $10^{-5}$ which is reflected by a variation in the velocity at which the radiation is propagated through the fiber. The radiation emerging from fibers 20 and 21 thus differ in phase by an amount that is different in the absence and in the presence of an acoustic wave. System 13 reflects half of the radiation from fiber 21 and transmits the other half in the same direction as the radiation, reflected by the system, from the reference fiber. A sensor, 22, detects the radiation resulting from the combination between the radiation from the fiber exposed to the acoustic wave and the radiation from the reference fiber. Said sensing indicates the variation in phase between said two radiations resulting from the variation in index; hence, it is possible to deduce the frequency $\Omega$ of the acoustic wave. A reliable hydrophone can thus be simply designed using the same basic structure.

FIG. 8 represents a wavelength multiplexer also using the same structure. The plate, which is still formed by the same successive layers, has no longer one source, but 3 sources, 31, 32, 33, whose output signals are to be mixed. The sources shown have not been provided with external resonators and are conventional semiconductor lasers soldered to the silicon substrate. The optical functions integrated in photo-polymer layer 8 are systems, 41, 42 and 43, formed by strata slanting at an angle of 45° in respect of the emission direction of the sources, and equidistant, but their lengths are such as to maximize diffraction efficiency. Each of them has a pitch that is matched to the corresponding source wavelength, with the result that it reflects a wave of a corresponding wavelength almost entirely but has no effect on waves of different wavelengths. The laser radiation from source 31 is thus reflected by system 41 but transmitted without modification by systems 42 and 43. Similarly, the laser radiation emitted by source 32 is reflected by system 42 and transmitted by system 43, while the radiation from source 33 is reflected by system 43. A fiber 23, coupled to the photo-polymer waveguide thus receives the radiation from the three laser sources. An analogous device can be used to demultiplex a signal comprising several optical carriers of differing wavelengths. For this purpose, the laser sources are replaced by sensors, if the different carrier waves are to be detected, or fibers are coupled to the photo-polymer waveguide to pick up the radiation selectively reflected by each of the systems.

Figure 9:
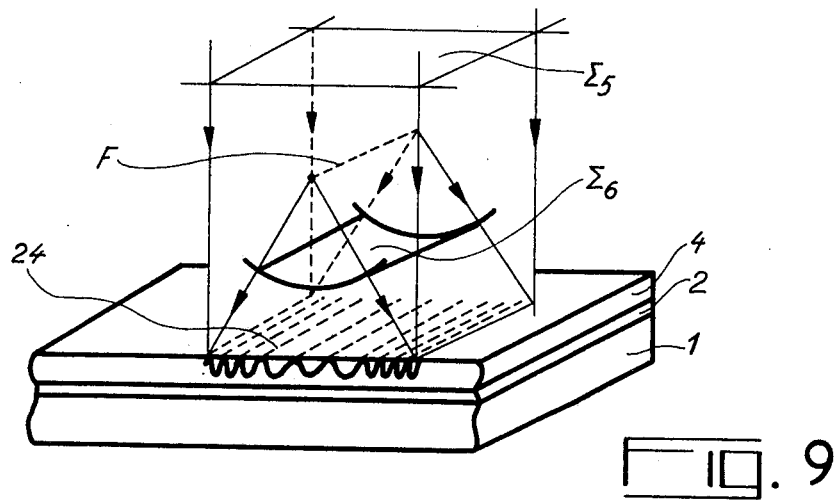
FIG. 9 represents the method of photo-inducing a photo-induced focusing structure.
Figure 10:
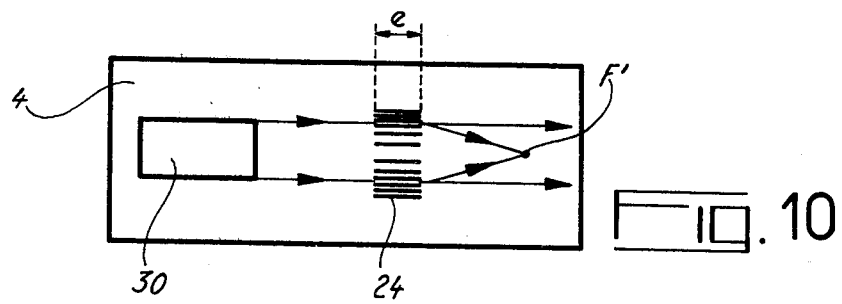
FIG. 10 represents a compact optical structure according to the invention using such a focusing structure.

For other applications, it may be necessary to photo-induce other structures performing other optical functions, for example focusing the radiation emitted by the source. FIGS. 9 and 10 illustrate, respectively, the mode of photo-inducing strata in the surface layer for the purpose of causing focusing of the radiation in the photo-polymer waveguide and a structure effecting said focusing function.

FIG. 9 represents a silicon substrate, 1, on which a layer of silicon dioxide, 2, has been produced. A layer of photo-polymer is then deposited on the silicon layer. The strata photo-induced in order to focus the beam are parallel but not equidistant. Their spacings correspond to a distribution in Fresnel zones. For this purpose, a planar wave $\Sigma_5$ parallel to the plane of the layer is directed towards this layer and interferes with a cylindrical wave $\Sigma_6$ having the same wavelength and whose focal line F is also parallel to the plane of the layer.

The focal line has a length that is determined as a function of the thickness, e, of the structure 24 to be obtained, said thickness being necessarily sufficiently small to enable the structure to be re-scanned by a radiation with a wavelength differing from the wavelength of registration.

FIG. 10 illustrates a compact optical structure with an integrated source comprising a photo-induced structure, 24, designed to focus the radiation emitted by the semiconductor laser source, 30, the variably spaced lines of this structure being arranged according to the direction of propagation of the incident parallel radiation. It should be noted that the position of the focal point F' in the photo-polymer waveguide in relation to the structure 24 is a function of the distance between the focal line F and the support at the time of registration and also a function of the ratio between the wavelength of the radiation used for registration and the wavelength of the rays emitted by the source 30. It should be noted that the convergent radiation at F' represents only a fraction of radiation emitted by said source, said radiation being the diffracted radiation of order O (approximately 30% of the incident radiation). At the same time, there exist fractions of incident radiation corresponding to the other orders of diffraction.

Figure 11:
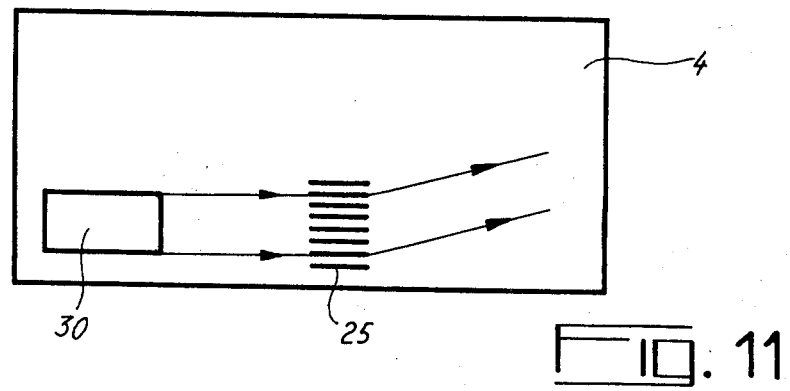
FIG. 11 represents a compact optical structure according to the invention comprising a photo-induced structure providing for deflection of the rays.

FIG. 11 represents a compact optical structure with an integrated source comprising a photo-induced structure, 25, ensuring the deflection of the radiation; the support comprises the same layers as shown in FIGS. 1 and 9; source 30 is a laser source for which no external resonator has been provided. The photo-induced structure 25 ensuring deflection of the light beam in the photo-polymer plane waveguide is formed of straight, equidistant strata arranged parallel to the direction of propagation of the rays emitted by the source. The radiation is diffracted by the system at an angle that is a function of the pitch of said system and of the wavelengths of the registration radiation and of the rays emitted by the laser source. As in the preceding case, there are fractions of radiation diffracted in other directions.

In the applications described above, the method of connecting the fibers to the compact optical structure has not been specifically described. Said connection can be effected using techniques such as printing the silicon so as to form a channel in the substrate designed to support the fiber, the angles of attack as well as the depth of attack of the silicon thus being very precisely determined so that the core of the fiber is accurately positioned in height with regard to the photo-polymer plane waveguide. The fiber is then fixed inside said channel. The photo-polymer can then be deposited without taking any particular precautions as regards fiber connections, or it can be deposited through a mask protecting the connection zones. Another method consists in attaching the end of the fiber to be connected to a support and then fixing said support on the silicon substrate in such a way that the core of the fiber comes into contact with the edge of the substrate, in the vicinity of the waveguide.

The invention is not confined to the forms of embodiment previously described to make apparent the characteristics of the invention, and all the individual applications using a compact optical structure with an integrated source including a layer of a photo-polymer disposed on the substrate of correct index for that layer of photo-polymer forming a waveguide after polymerisation, and a superficial layer in which the optical functions, operating by variation in index or in relief, may be photo-induced, are in the sphere of the invention. Moreover, certain practical details of realisation have not been precisely described, for example the electrodes controlling the emitter junction and the electrodes of the exit of the detectors. These electrodes are obtained in a known manner, for example, by gold-plating. Bands may be provided to hold the electrodes beside the plate so as to grip the contacts.

What we claim is:

1. Compact optical structure comprising a plate comprising a substrate, an integrated laser diode fixed to said substrate having an emission face designed to emit an optical wave, a plane waveguide layer in contact with a face of said substrate, said layer being formed by a photo-polymer with an index higher than that of the underlying layer of the substrate, and an upper layer above the waveguide layer comprising photoinduced diffraction structures entirely separated from said laser diode, the emission face of the diode being arranged in such a way that the wave is guided in the waveguide layer and deflected by the diffraction structures of the upper layer.

2. Optical structure as claimed in claim 1, wherein said laser diode comprises a semiconductor laser having a distributed external resonator, the upper layer comprising an optical diffraction structure formed of equidistant strata parallel to the surfaces of said optical wave, the pitch of said strata being equal to $k(\lambda/2n)$, wherein $\lambda$ is the wavelength of the photons emitted, n the index of the photo-polymer and k an integer, so that there is reflection on the strata, the emission face of said diode, opposite to said resonator being split.

3. Optical structure as claimed in claim 2, wherein said resonator is formed of planar strata.

4. Optical structure as claimed in claim 2 wherein said resonator is formed of equidistant strata having a given radius of curvature to compensate for the divergency of the wave.

5. Optical structure as claimed in claim 1, wherein said diode is provided with a heat sink, the emission face of said diode being optically and mechanically coupled to the plane photo-polymer waveguide by a cement having a suitable index, providing connection between said emission face and the edge of the substrate in the vicinity of the plane-wave guide.

6. Optical structure as claimed in claim 1, wherein the substrate is formed by a silicon support on which a layer of silicon dioxide has been deposited, said layer of silicon dioxide being removed in a zone to which the integrated diode is soldered in such a way that the silicon support plays the part of a heat sink.

7. Optical structure as claimed in claim 1, wherein the upper layer is a layer of photo-polymer in which the photo-induced diffraction structures are formed by variations in index.

8. Optical structure as claimed in claim 1, wherein the upper layer is a layer of photo-sensitive resin in which the diffraction structures are variations in index.

9. Optical structure as claimed in claim 1, wherein the photo-induced structures are treated to form diffraction structures by variation in relief.

10. Optical structure as claimed in claim 1, further comprising at least one diffraction structure formed by parallel equidistant strata which are oblique with regard to the direction of propagation of the optical wave through the guide, the thickness that the structure presents to the radiation being adjusted so that the diffraction efficiency is of a given value, such a structure functioning as a separator.

11. Optical structure as claimed in claim 1, further comprising at least one diffraction structure having strata to form a zone system having a constant pitch, such a diffraction structure functioning as a deflector.

12. Optical structure as claimed in claim 1, further comprising at least one diffraction structure having strata forming a zone system in which said zones have predetermined lengths and spacings to form a zoned lens, such a structure functioning as focusing means.

13. Optical structure as claimed in claim 1, further comprising at least one diffraction structure formed of equidistant parallel strata which are oblique with respect to the direction of propagation of the optical wave having a thickness such that diffraction efficiency is maximized, such a diffraction structure functioning as a reflector.

* * * * *